United States Patent [19]

Rhule et al.

[11] Patent Number: 5,560,648
[45] Date of Patent: Oct. 1, 1996

[54] AIR BAG DEPLOYMENT BIAS APPARATUS

[75] Inventors: Daniel A. Rhule, Miamisburg; John P. Sparkman, Dayton, both of Ohio

[73] Assignee: General Motors Corporation, Detroit, Mich.

[21] Appl. No.: 519,053

[22] Filed: Aug. 24, 1995

[51] Int. Cl.$^6$ .................................................. B60R 21/22
[52] U.S. Cl. ........................................ 280/731; 280/743.2
[58] Field of Search .................................. 280/731, 730.1, 280/728.2, 728.1, 743.1, 743.2, 728.3, 732, 729, 742

[56] References Cited

U.S. PATENT DOCUMENTS

| | | | |
|---|---|---|---|
| 4,332,398 | 6/1982 | Smith | 280/732 |
| 4,449,728 | 5/1984 | Pilatzki | 280/731 |
| 4,772,045 | 9/1988 | Kawaguchi et al. | 280/731 |
| 4,911,471 | 3/1990 | Hirabayashi | 280/732 |
| 5,004,266 | 4/1991 | Miller et al. | 280/743.2 |
| 5,160,164 | 11/1992 | Fischer et al. | 280/732 |
| 5,348,343 | 9/1994 | Hawthorn | 280/730.1 |
| 5,351,987 | 10/1994 | Donegan et al. | 280/728.2 |
| 5,364,124 | 11/1994 | Donegan et al. | 280/730.1 |
| 5,498,023 | 3/1996 | Adams et al. | 280/728.2 |

FOREIGN PATENT DOCUMENTS

| | | | |
|---|---|---|---|
| 0453740A1 | 10/1991 | European Pat. Off. | |
| 0558271A1 | 9/1993 | European Pat. Off. | 280/728.2 |
| 4010767A1 | 10/1991 | Germany | |
| 2-158444A | 6/1990 | Japan | 280/728.2 |
| 3-136946 | 6/1991 | Japan | 280/728.2 |
| 5004558 | 1/1993 | Japan | |

*Primary Examiner*—Brian L. Johnson
*Assistant Examiner*—Peter C. English
*Attorney, Agent, or Firm*—Kathryn A. Marra

[57] ABSTRACT

A vehicle steering wheel and air bag module assembly includes a steering wheel and an air bag module. The steering wheel has a hub portion and a rim portion and at least one spoke portion connecting the hub portion to the rim portion. The air bag module is mounted to the hub portion and includes an air bag, an inflator for generating gas to inflate the air bag, and a bias apparatus. The bias apparatus is a flexible sheet of material attached to the air bag module and having an upper portion folded atop the air bag such that when the inflation of the deploying air bag is blocked, the upper portion of the bias apparatus biases the air bag partially underneath the rim portion of the steering wheel. In addition, when the inflation of the deploying air bag is unrestrained, the bias apparatus drops downwardly away from the deploying air bag permitting the air bag to freely deploy.

19 Claims, 7 Drawing Sheets

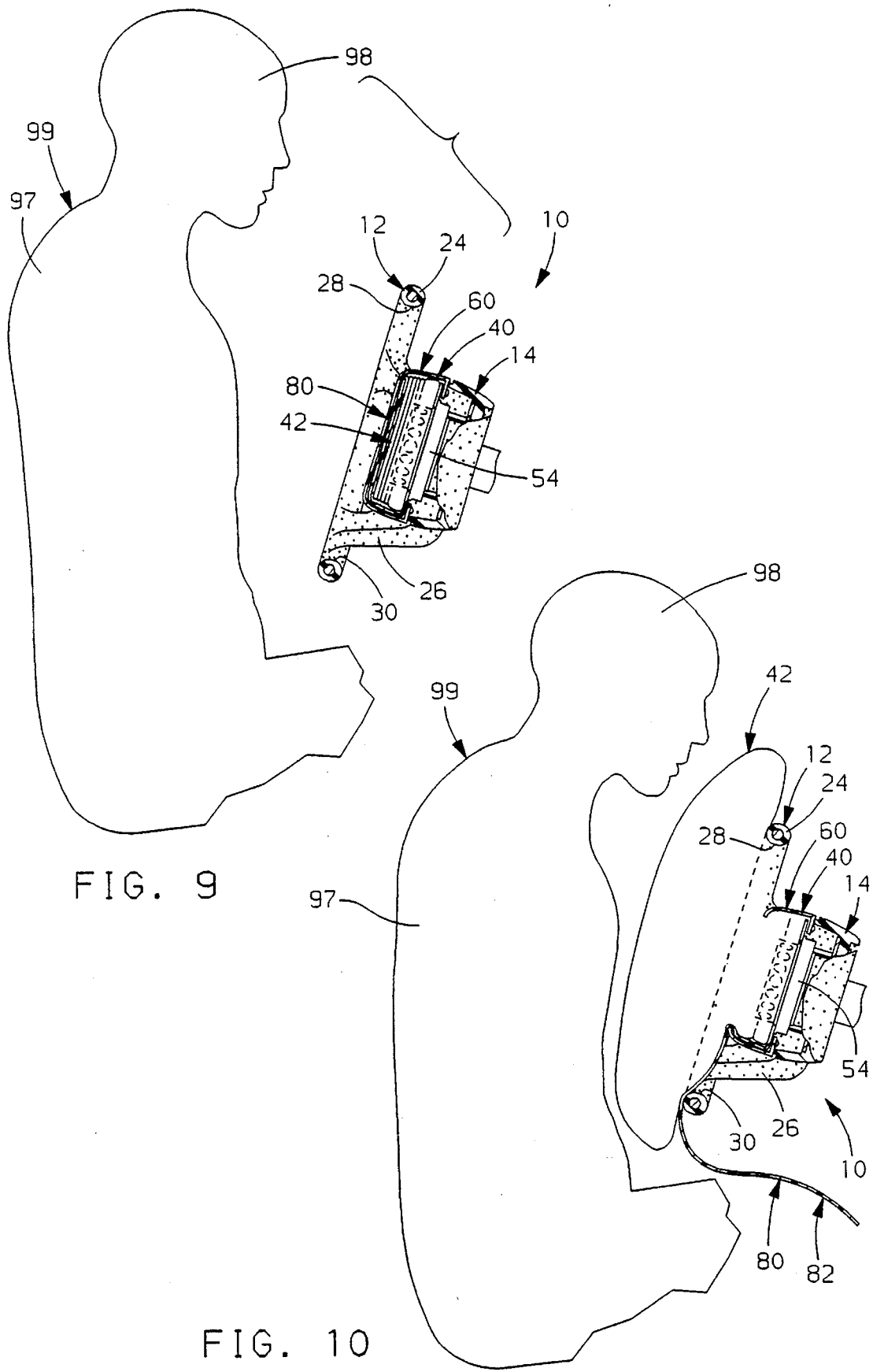

AIR BAG DEPLOYMENT BIAS APPARATUS

This invention relates to a vehicle air bag module, and more particularly to an apparatus for biasing the direction of a deploying air bag.

BACKGROUND OF THE INVENTION

It is well known in motor vehicles to provide a driver's side air bag module which is mounted to a steering wheel. The air bag module typically includes a base plate and an inflator mounted to the base plate for generating gas to inflate an air bag folded atop the inflator. The module also typically includes a cover covering the air bag and inflator and having hinged flaps formed by weakened portions in the cover. Upon air bag deployment, the air bag forces open the flaps and deploys out through an opening in the cover.

It is also known in prior art driver's side air bag modules to provide devices such as internal tethers, flaps, or vents which help to direct the air bag during deployment. However, these devices are internal to the air bag and thus cannot interact with the vehicle occupant and vehicle steering wheel. Accordingly, these internal devices are not designed to take advantage of the features of the driver's side vehicle environment external to the air bag.

The prior art also discloses passenger side air bag modules in which an air bag deploys out through an opening in the instrument panel and deployment of the air bag is directed by a biasing apparatus such as a flexible sleeve or chute folded atop the air bag in the module. However, these passenger side bias apparatus are typically used to laterally bias the air bag away from the occupant. Thus, the passenger side biasing apparatus are not designed to function in the driver's side environment and are also not designed to take advantage of the surrounding environment on the driver's side of the vehicle.

SUMMARY OF THE INVENTION

The present invention overcomes the shortcomings of the prior art by providing a vehicle steering wheel and air bag module assembly including a bias apparatus which controls the deployment direction of a driver's side air bag and which is also easy to assemble to an existing driver's side air bag module. When initial deployment of the air bag is blocked by a vehicle occupant, the bias apparatus advantageously partially biases the air bag away from the occupant and underneath the rim portion of the steering wheel while restraining the torso of the occupant. When an occupant is in the normal seating position and the air bag is unrestrained during initial deployment, the bias apparatus immediately drops out of the way and does not interfere with the deploying air bag.

These advantages are accomplished in an embodiment of the present invention by providing a vehicle steering wheel and air bag module assembly including a steering wheel and an air bag module. The steering wheel has a hub portion and a rim portion and at least one spoke portion connecting the hub portion to the rim portion. The air bag module is mounted to the hub portion and includes an air bag, an inflator for generating gas to inflate the air bag, and a bias apparatus. The bias apparatus is a flexible sheet of material attached to the air bag module and having an upper portion folded atop the air bag such that when the inflation of the deploying air bag is blocked, the upper portion of the bias apparatus biases the air bag partially underneath the rim portion of the steering wheel. In addition, when the inflation of the deploying air bag is unrestrained, the bias apparatus drops downwardly away from the deploying air bag permitting the air bag to freely deploy.

In accordance with another aspect of this invention, the air bag deploys in a rearwardly direction and the hub portion and air bag module are preferably offset from the rim portion in a forwardly direction. In accordance with yet another aspect, the steering wheel preferably includes at least one space defined between the hub portion and the rim portion through which the air bag is biased by the bias apparatus during air bag deployment.

BRIEF DESCRIPTION OF THE DRAWINGS

An embodiment of the present invention is described, by way of example only, with reference to the accompanying drawings in which:

FIG. 9 is partially-broken-away view of the steering wheel and air bag module assembly similar to FIG. 5, but with the occupant in a normal seating position just prior to air bag deployment;

FIG. 10 is a view similar to FIG. 9, but showing the assembly and occupant at approximately 15 ms after air bag deployment.

DESCRIPTION OF THE PREFERRED EMBODIMENT

Figure 1:
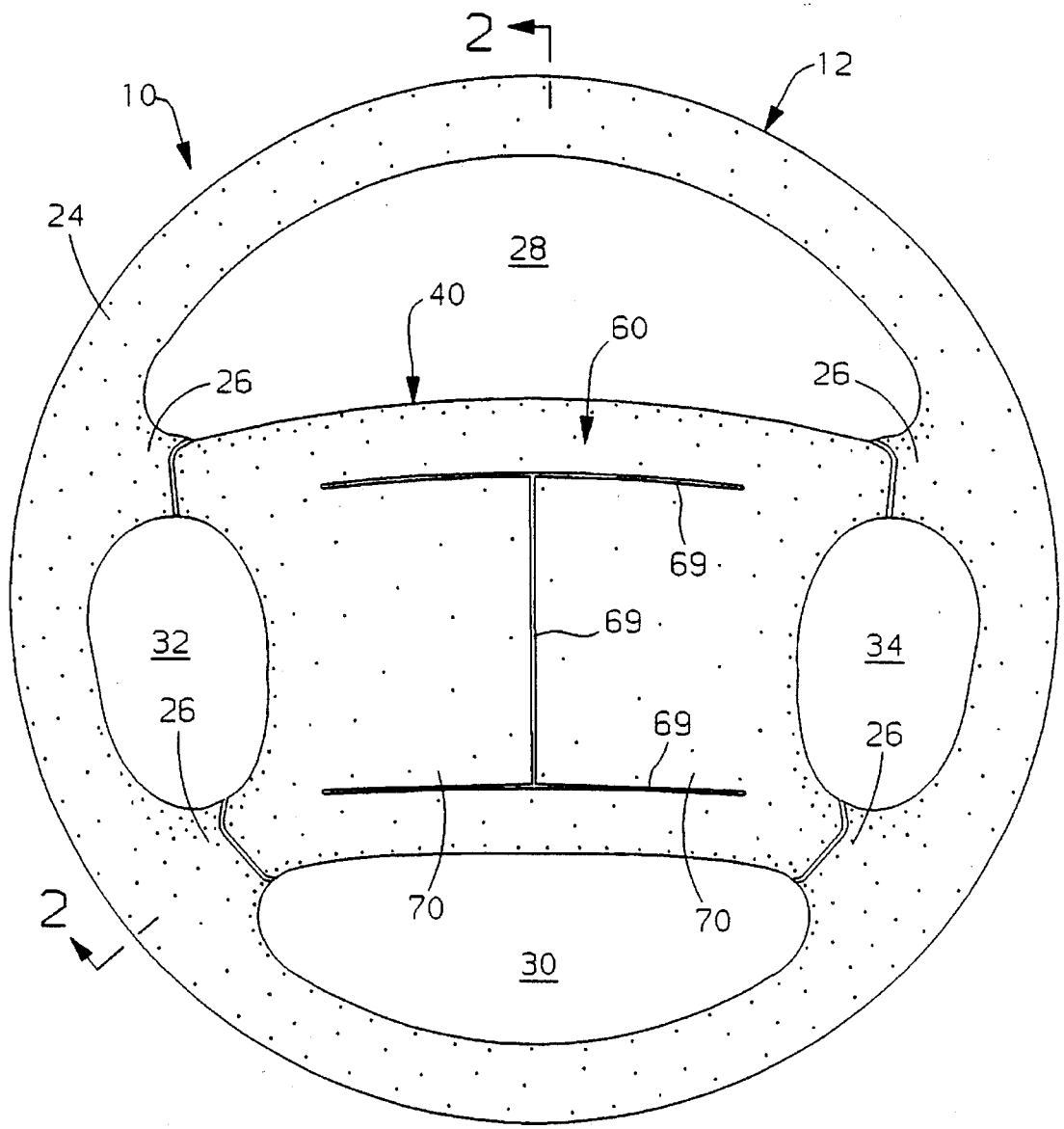
FIG. 1 is a plan view of a vehicle steering wheel and air bag module assembly.
Figure 2:
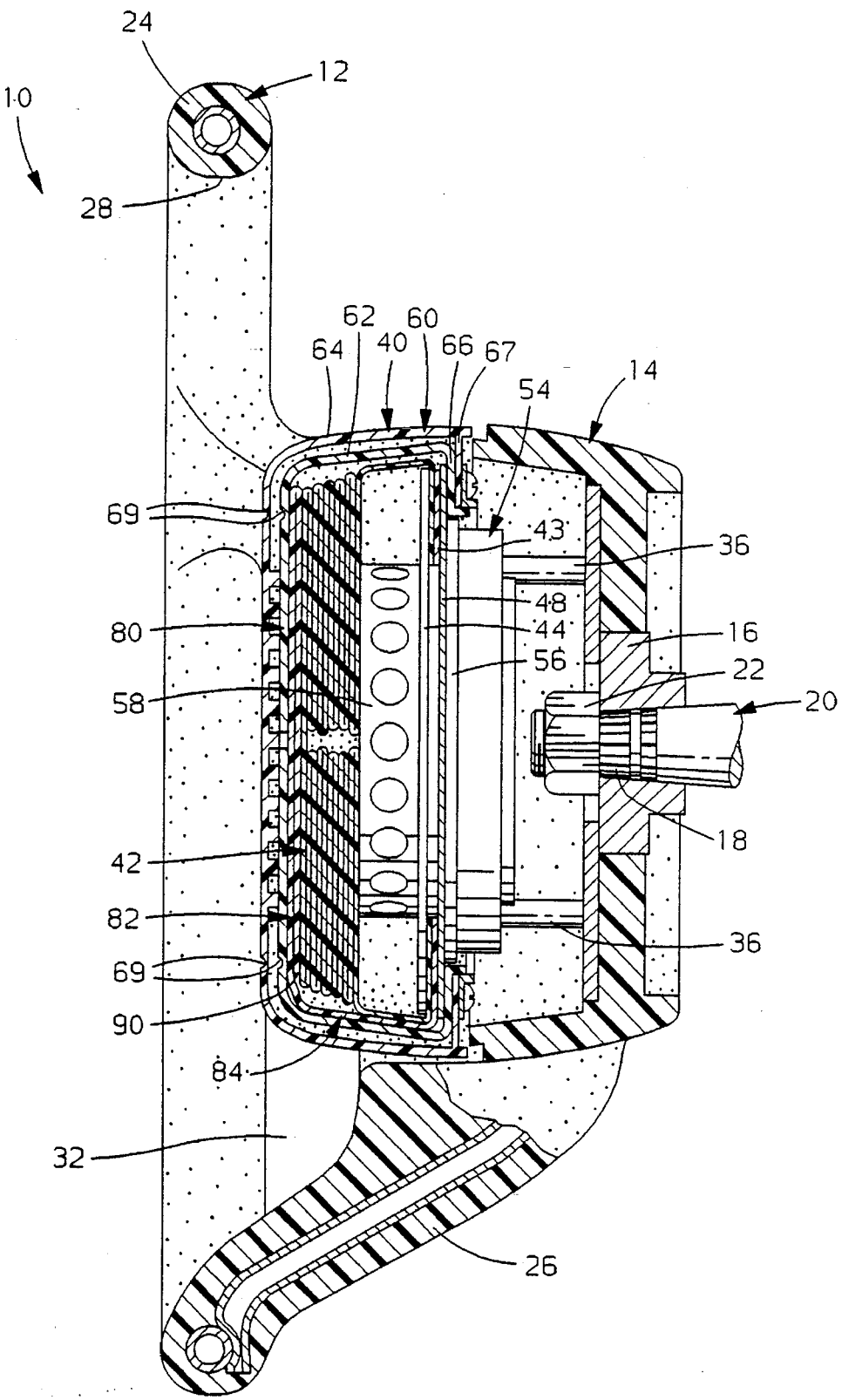
FIG. 2 is a sectional view taken along line 2—2 of FIG. 1.

Referring to FIGS. 1 and 2, it is seen that a vehicle steering wheel and air bag module assembly, generally designated as 10, includes an air bag module 40 suitably mounted to a central hub portion 14 of a vehicle steering wheel 12. The hub portion 14 includes a splined bushing 16 which receives the upper splined end 18 of the vehicle steering shaft 20 and is bolted thereto at 22 to secure the steering wheel 12 to the vehicle steering system.

The vehicle steering wheel 12 also includes a circular steering wheel rim portion 24 integrally connected to the hub portion 14 by a plurality of spoke portions 26 extending therebetween, as best shown in FIG. 1. The steering wheel 12 also includes upper, lower, and side spaces 28, 30, 32, 34, respectively, defined between the hub portion 14 and the rim portion 24 and separated by the spoke portions 26. Preferably, at least one of the spaces, in this case the upper space 28, is sufficiently large such that a deploying air bag 42 of the air bag module 40 can be biased out through the upper space 28 of the steering wheel 12 and underneath the rim portion 24, as described further hereinafter.

The air bag module 40 is mounted to the hub portion 14 of the vehicle steering wheel 12 and includes a base plate 48, an inflator 54, an air bag 42, an air bag retainer 44, a bias apparatus 80, and a cover 60. Referring to FIG. 2, the base plate 48 is generally rectangular-shaped and has a central circular plate opening (not shown). The inflator 54 may be of any construction for generating gas to inflate the air bag 42 upon sensing predetermined vehicle conditions. The inflator 54 includes an inflator flange 56 seated against a lower side of the base plate 48 and secured thereto in a conventional manner. An upper gas outlet portion 58 of the inflator 54 projects through the plate opening in the base plate 48 and into the interior of the folded inflatable air bag 42 for discharging inflator gas in a rearwardly direction into the air bag 42.

The air bag 42 is formed of a suitable fabric material and is normally stored in a folded condition atop the inflator 54. The air bag retainer 44 is ring-shaped and is fastened to the base plate 48 around the plate opening to clamp a mouth portion 43 of the air bag 42 to the base plate 48 of the air bag module 40 in a conventional manner. Upon generation of gas by the inflator 54, the air bag 42 deploys out through the cover 60 in a rearwardly direction towards a vehicle occupant 99, as described in detail hereinafter.

The cover 60 is preferably formed of a plastic material and includes an inner container portion 62 and an outer decorative cover portion 64 for covering the air bag 42, bias apparatus 80, and inflator 54. The cover 60 maintains the air bag 42 and bias apparatus 80 in the folded condition prior to air bag 42 deployment. The inner container portion 62 and the outer decorative cover portion 64 each include circumferential cover flanges 66, 67 underlying the base plate 48 and suitably secured thereto. The portions 62, 64 of the cover 60 are each provided with weakened tear lines 69 defining separable flaps 70 which pivot open upon air bag 42 deployment.

Figure 3:
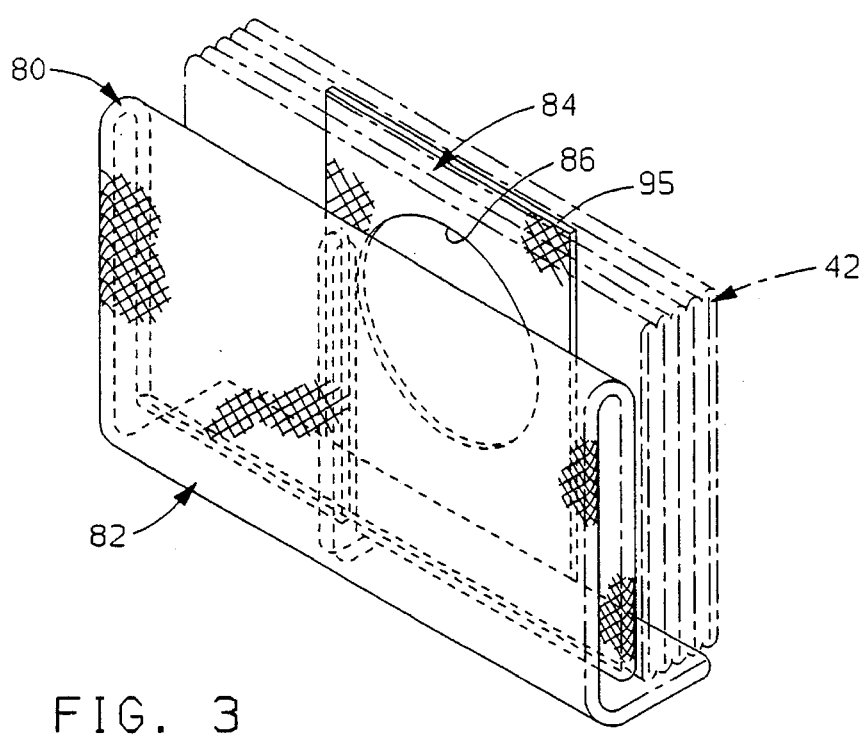
FIG. 3 is a perspective view of an air bag and a bias apparatus of the air bag module in the folded condition.
Figure 4:
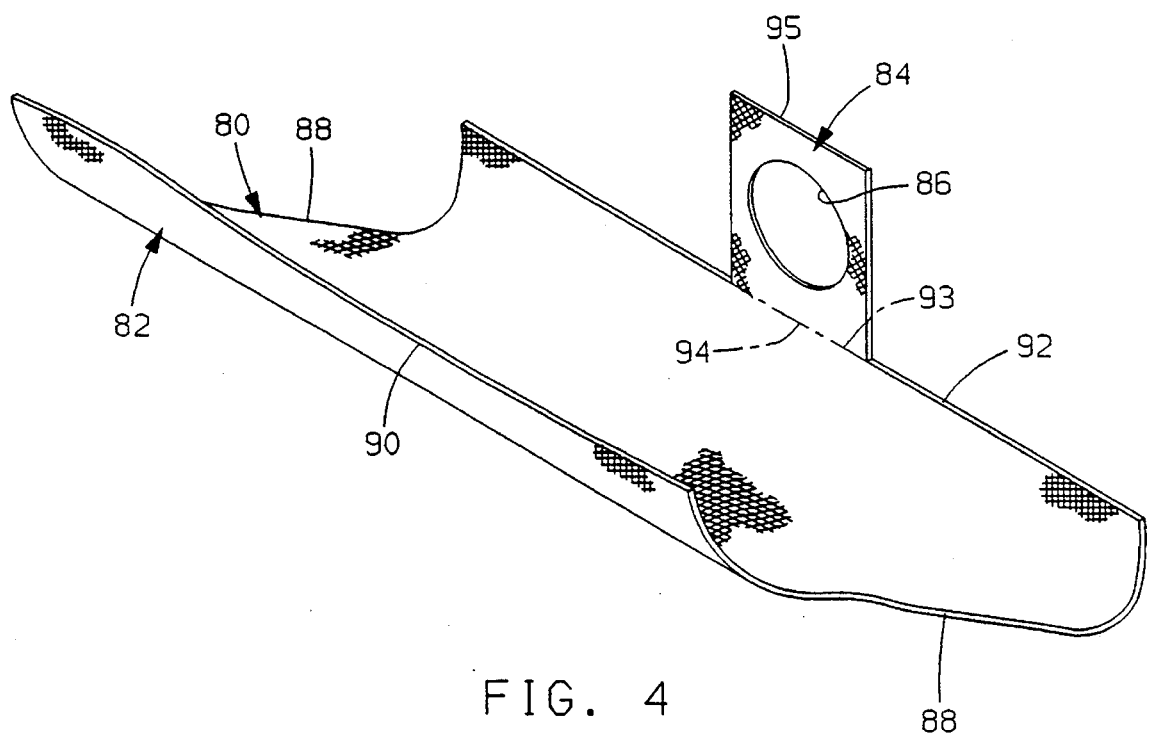
FIG. 4 is a perspective view of the bias apparatus.

Referring to FIGS. 3 and 4, the bias apparatus 80 is provided to bias the direction of air bag 42 inflation under certain conditions. The bias apparatus 80 is preferably formed completely independent and separate from both the air bag 42 and the cover 60. The bias apparatus 80 is preferably made from a flat sheet of fabric or other flexible, foldable material as shown in the unassembled condition in FIG. 4. The bias apparatus 80 includes an upper flap portion 82 and an integrally foraged lower mounting portion 84 having a mounting opening 86 therein. The mounting opening 86 is sized for alignment with the plate opening of the base plate 48. The bias apparatus 80 is attached to the air bag module 40 by trapping the mounting portion 84 between the air bag retainer 44 and base plate 48, as described further hereinafter. The upper flap portion 82 includes a pair of free lateral side edges 88 and an upper longitudinal free edge 90. A lower longitudinal edge 92 has a central portion 93 integrally connected to a longitudinal connecting edge 94 of the mounting portion 84. The mounting portion 84 includes a longitudinal mounting portion free edge 95 opposite the connecting edge 94.

The upper flap portion 82 of the bias apparatus 80 is preferably wider than the rim portion 24 of the steering wheel 12 and is preferably about equal to an unfolded width of the air bag 42. FIG. 3 shows the folded air bag 42 and bias apparatus 80 in the assembled condition, but separate from the remainder of the air bag module 40 for clarity. In the assembled condition, the mounting portion 84 of the bias apparatus 80 is positioned beneath the air bag 42 and the upper flap portion 82 of the bias apparatus 80 is folded atop the air bag 42. It will be appreciated that the upper flap portion 82 of the bias apparatus 80 is preferably folded laterally inwardly to a width that fits within the air bag module 40 and then longitudinally folded in an overlapping manner best shown in FIG. 3. It will further be appreciated that the upper flap portion 82 of the bias apparatus 80 has a longitudinal height such that it extends upwardly past the rim portion 24 of the steering wheel 12 in the unfolded condition.

The air bag module 40 is assembled as follows. The air bag 42 is suitably connected to the air bag retainer 44. Preferably, the mounting opening 86 of the mounting portion 84 of the bias apparatus 80 is aligned with the plate opening of the base plate 48 and the mounting portion 84 is trapped between the air bag retainer 44 and base plate 48 such that the air bag retainer 44 suitably secures the bias apparatus 80 to the base plate 48 along with the mouth portion 43 of the air bag 42. Thus, the bias apparatus 80 is easily assembled to the air bag module 40 without the use of any additional parts except the bias apparatus 80 itself. Preferably prior to assembly of the inflator 54 to the base plate 48, the air bag 42 and bias apparatus 80 may both be connected to the air bag retainer 44 and base plate 48 and the air bag 42 may advantageously be folded in a conventional manner after which the bias apparatus 80 may be folded atop the folded air bag 42. In this manner, the bias apparatus 80 does not interfere with the normal folding operation of the air bag module 40. Also advantageously, the bias apparatus 80 is easily incorporated into existing air bag module designs. Next, the air bag 42, and bias apparatus 80 and inflator 54 are dropped down into the cover 60 and the inflator flange 56 and cover flanges 66, 67 are then suitably connected to the base plate 48. Thus, the inflator 54, the air bag retainer 44, the air bag 42, the cover 60, and the bias apparatus 80 are each secured to the base plate 48 to provide the air bag module 40.

To provide the vehicle steering wheel and air bag module assembly 10, the completed air bag module 40 is assembled in overlying relationship to the hub portion 14 of the steering wheel 12 in a suitable manner, such as by fasteners (not shown) which extend upwardly through apertures (not shown) in the hub portion 14 and into tapped struts 36 which are secured to the base plate 48. Preferably in this assembly 10, the mounting portion free edge 95 of the mounting portion 84 is aligned next to the upper space 28 of the steering wheel 12 and the upper flap portion 82 is folded in an manner such that the upper longitudinal free edge 90 and free lateral side edges 88 are caught beneath the rim portion 24 of the steering wheel 12 during initial air bag 42 deployment. As best shown in FIG. 2, it is also preferred that the hub portion 14 and air bag module 40 in the assembled condition are offset in a forwardly direction from the rim portion 24 of the steering wheel 12 to best ensure that the free edges 88, 90 of the upper flap portion 82 get caught beneath the rim portion 24 of the steering wheel 12 during initial air bag 42 deployment.

Upon sensing a predetermined vehicle condition, the inflator 54 generates gas in the rearwardly direction to inflate the air bag 42 which breaks open the separable flaps 70 of the cover 60 and deploys outwardly towards the vehicle occupant 99. The deploying air bag 42 pushes the upper flap portion 82 of the bias apparatus 80 ahead of the air bag 42 during initial deployment such that the bias apparatus 80 is initially positioned between the air bag 42 and the vehicle occupant 99.

With reference to FIGS. 5–11, the vehicle steering wheel and air bag module assembly 10 including the bias apparatus 80 functions as follows during air bag 42 deployment. In general, when the inflation of the deploying air bag 42 is blocked such as by the occupant 99, the upper flap portion 82 of the bias apparatus 80 is trapped between the occupant 99 and the air bag 42 and thus also becomes trapped between the rim portion 24 of the steering wheel 12 and the air bag 42 to bias the inflating air bag 42 partially underneath the rim portion 24 of the steering wheel 12 and away from the vehicle occupant 99. However, when the inflation of the deploying air bag 42 is unrestrained or not blocked by the occupant 99, the bias apparatus 80 immediately drops downwardly away from the deploying air bag 42 permitting the air bag 42 to freely deploy.

Figures 5, 6:
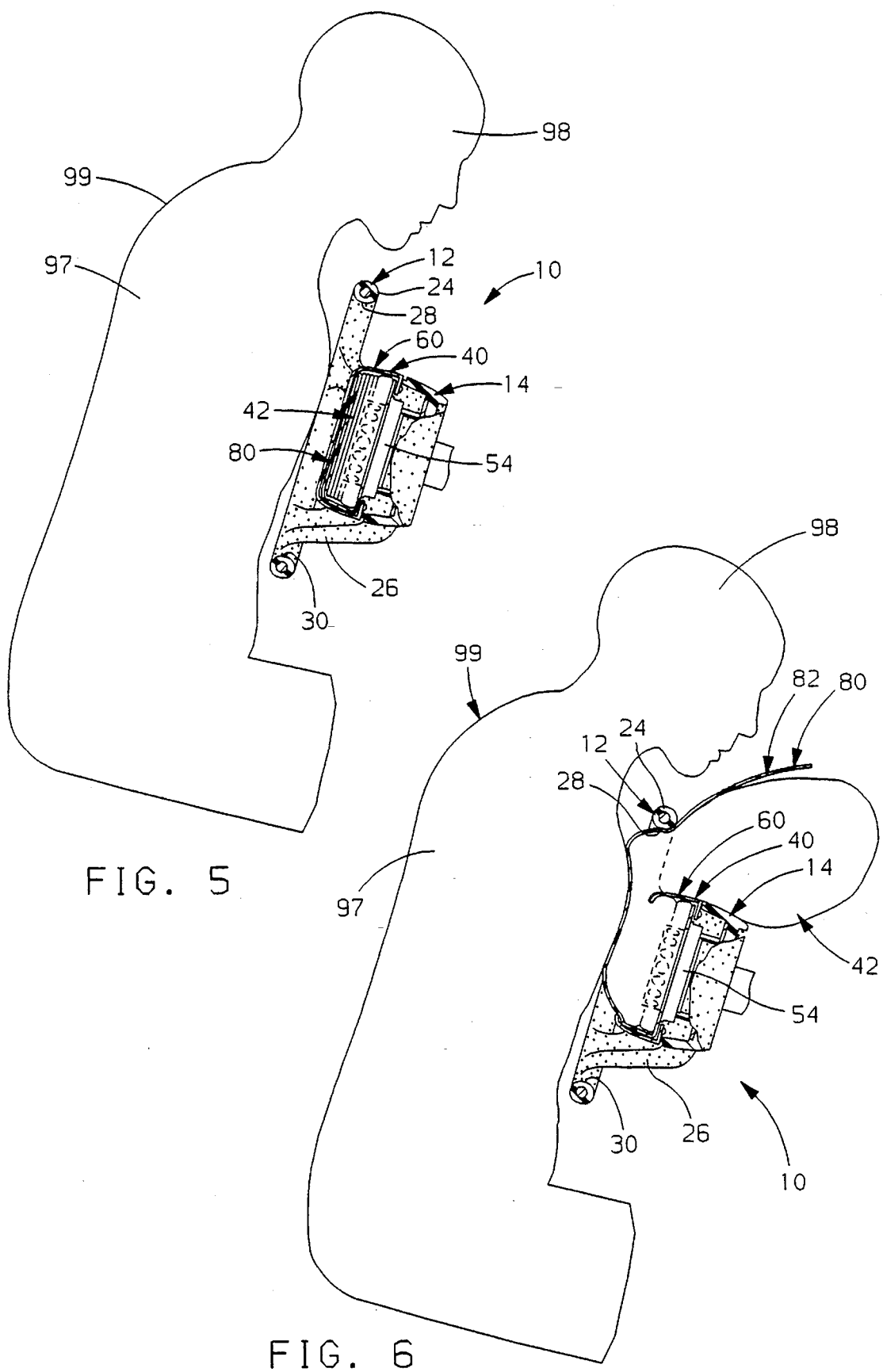
FIG. 5 is partially-broken-away view of the steering wheel and air bag module assembly with an occupant adjacent the assembly just prior to air bag deployment.
FIG. 6 is a view similar to FIG. 5, but showing the assembly and occupant at approximately 15 ms after air bag deployment.
Figures 7, 8:
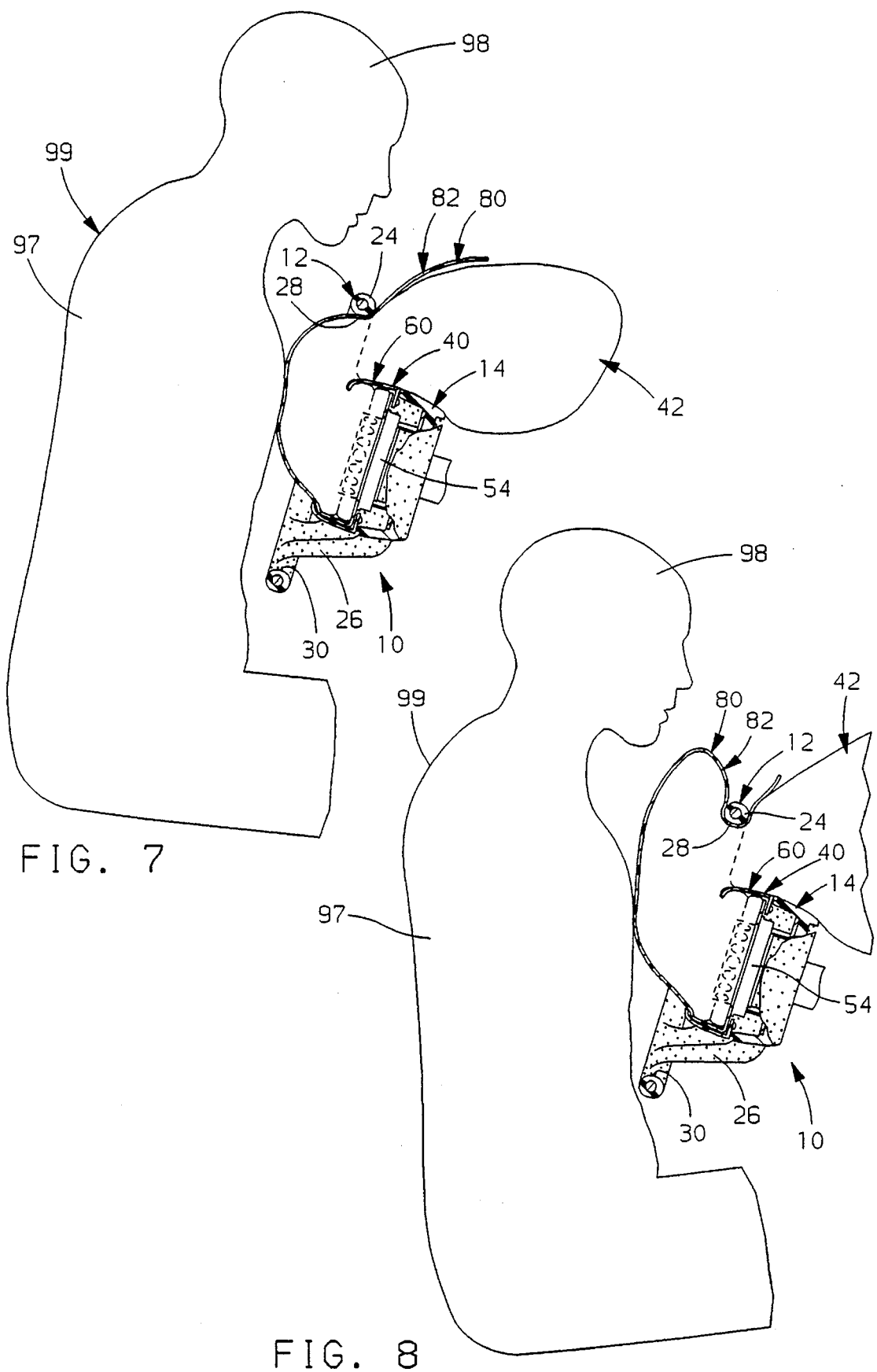
FIG. 7 is a view similar to FIG. 5, but showing the assembly and occupant at approximately 60 ms after air bag deployment.
FIG. 8 is a view similar to FIG. 5, but showing the assembly and occupant at approximately 75 ms after air bag deployment.

More particularly, FIGS. 5–8 show the function of the assembly 10 when the occupant 99 is against the air bag module 40 just prior to deployment, as shown in FIG. 5, such that normal deployment of the air bag 42 in the rearwardly direction towards the occupant 99 is blocked. FIG. 6 shows the assembly 10 at approximately 15 ms after deployment. At this time, the upper flap portion 82 of the bias apparatus 80 is trapped between the torso 97 of the occupant 99 and the deploying air bag 42. As a result, the free edges 88, 90 of the upper flap portion 82 of the bias apparatus 80 become trapped between the rim portion 24 of the steering wheel 12 and the air bag 42 such that the air bag 42 is biased partially underneath the rim portion 24 of the steering wheel 12 and out through the upper space 28 of the steering wheel 12 and away from the vehicle occupant 99. FIGS. 7 and 8 show the assembly 10 at approximately 60 ms and 75 ms, respectively, after air bag 42 deployment. The bias apparatus 80 continues to bias the air bag 42 partially underneath the rim portion 24 of the steering wheel 12 and out through the upper space 28 defined between the rim portion 24 and the hub portion 14 of the steering wheel 12. It will also be appreciated that the air bag 42 partially continues to deploy in the rearwardly direction towards the vehicle occupant 99 to gradually restrain the torso 97 of the occupant 99. Thus by utilizing the bias apparatus 80 in conjunction with the rim portion 24 of the vehicle steering wheel 12, the assembly 10 provides some initial restraint to the torso 97 of the occupant 99 while preventing full direct contact of the air bag 42 with other parts of the occupant 99, such as the head 98, when the occupant 99 is adjacent the air bag module 40 just prior to air bag 42 deployment. Advantageously, by trapping the bias apparatus 80 between the rim portion 24 of the steering wheel 12 and the deploying air bag 42, the deploying air bag 42 is biased at a convenient height to permit some initial restraint of the torso 97 of the occupant 99. It is also noted that since the bias apparatus 80 is preferably wider than the rim portion 24 of the steering wheel 12, the entire rearward surface of the air bag 42 is covered by the bias apparatus 80 to bias lateral portions of the air bag 42 underneath the rim portion 24 as well as the upper portion of the air bag 42 as shown in section in FIGS. 5–8.

Figure 11:
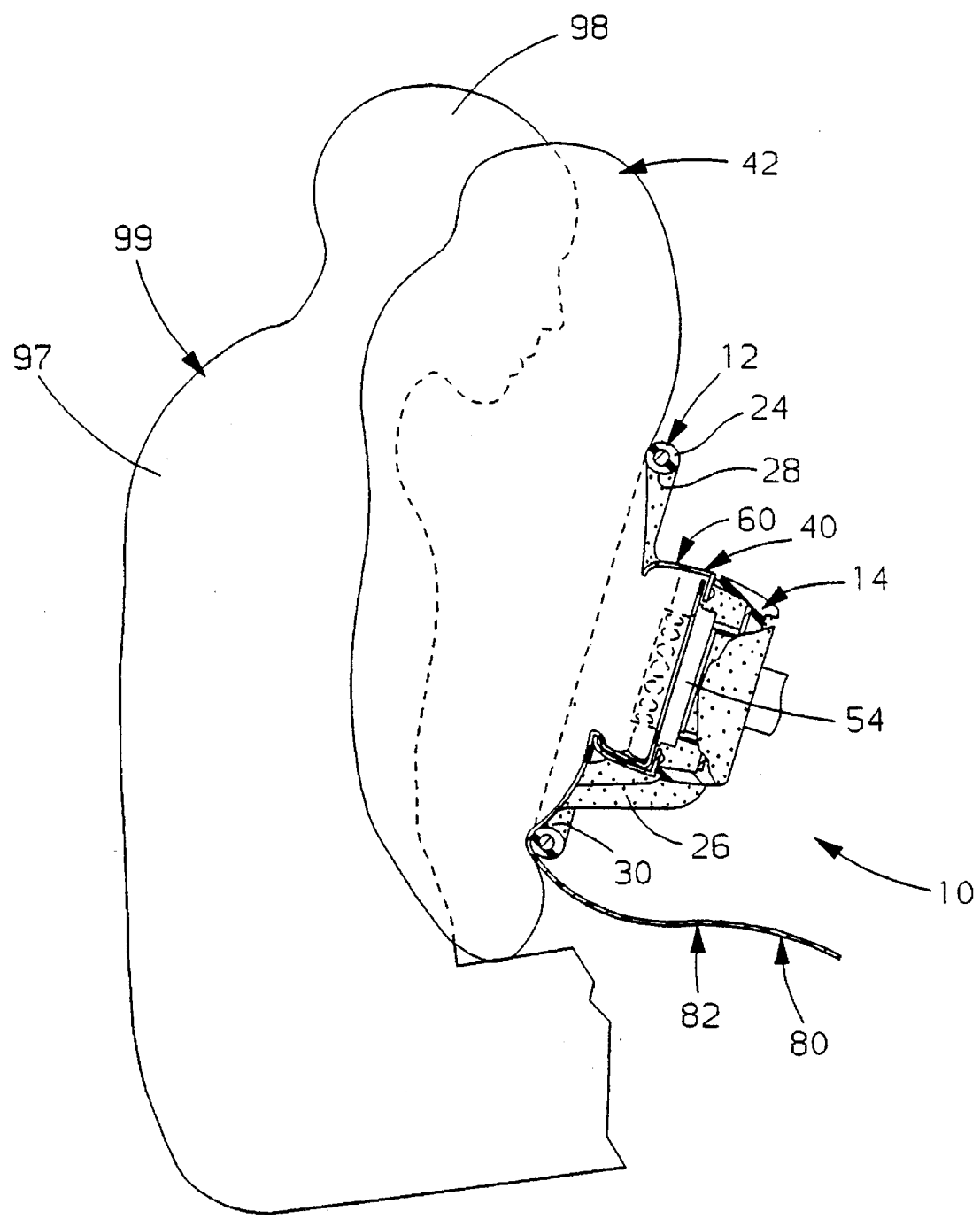
FIG. 11 is a view similar to FIG. 9, but showing the assembly and occupant at approximately 75 ms after air bag deployment.

More particularly, FIGS. 9–11 show the function of the assembly 10 when the occupant 99 is in the normal seating position spaced away from the air bag module 40 just prior to deployment such that normal deployment of the air bag 42 in the rearwardly direction towards the occupant 99 is unrestrained. FIGS. 10 and 11 show the assembly 10 at approximately 15 ms and 75 ms after deployment, respectively. When the air bag 42 is unrestrained, the upper flap portion 82 of the bias apparatus 80 almost immediately (within a few ms) is pushed downwardly away from the deploying air bag 42 so that the air bag 42 can freely deploy in the normal manner without any biasing effect from the bias apparatus 80.

It will be understood that a person skilled in the art may make modifications to the preferred embodiment shown herein within the scope and intent of the claims. Although the preferred embodiment shows four spoke portions 26 with the upper space 28 being the space through which the air bag 42 is biased, many configurations of the spoke portions 26 may be utilized for connecting the rim portion 24 to the hub portion 14, as long as there is sufficient space or spaces available somewhere between the rim portion 24 and hub portion 14 to provide a path for the biased air bag 42 underneath the rim portion 24. Although the preferred bias apparatus 80 is shown with the lower mounting portion 84 trapped between the air bag retainer 44 and the base plate 48 for ease of assembly 10, many other mounting methods may be used to attach the bias apparatus 80 to the air bag module 40, such as by fasteners, hooks or sewing to the air bag 42, as long as the bias apparatus 80 is attached to the air bag module 40 and includes the upper flap portion 82 folded atop the air bag 42. It will be appreciated that the usual internal tethers, straps, vents and flaps (not shown) may also be used to direct the air bag 42 during unrestrained deployment. It will also be appreciated that any typical cover 60 which opens during air bag deployment may be utilized.

While the present invention has been described as carded out in a specific embodiment thereof, it is not intended to be limited thereby but is intended to cover the invention broadly within the scope and spirit of the claims.

The embodiments of the invention in which an exclusive property or privilege is claimed are defined as follows:

1. A vehicle steering wheel and air bag module assembly comprising:

a steering wheel having a hub portion and a rim portion and at least one spoke portion connecting the hub portion to the rim portion; and an air bag module mounted to the hub portion and including an air bag, an inflator for generating gas to inflate the air bag, and a bias apparatus being a flexible sheet of material attached to the air bag module and having an upper portion folded atop the air bag such that when the inflation of the deploying air bag is blocked, the upper portion of the bias apparatus biases the air bag partially underneath the rim portion of the steering wheel.

2. The vehicle steering wheel and air bag module assembly of claim 1 wherein the bias apparatus is formed separate and independent from the air bag and is external to the air bag.

3. The vehicle steering wheel and air bag module assembly of claim 1 wherein the bias apparatus has a lower mounting portion located beneath the air bag.

4. The vehicle steering wheel and air bag module assembly of claim 1 wherein the bias apparatus has a lateral width greater than a lateral width of the rim portion of the steering wheel.

5. The vehicle steering wheel and air bag module assembly of claim 1 wherein the bias apparatus has a lateral width approximately equal to a lateral width of the air bag.

6. The vehicle steering wheel and air bag module assembly of claim 1 wherein the air bag module further includes a cover covering the air bag, inflator, and bias apparatus and wherein the bias apparatus is separate and independent from the cover.

7. The vehicle steering wheel and air bag module assembly of claim 6 wherein the bias apparatus is separate and independent from the air bag.

8. The vehicle steering wheel and air bag module assembly of claim 1 wherein the air bag deploys in a rearwardly direction and wherein the hub portion and air bag module are both offset from the rim portion in a forwardly direction.

9. The vehicle steering wheel and air bag module assembly of claim 1 wherein the steering wheel includes at least one space defined between the hub portion and the rim portion through which the air bag is biased by the bias apparatus during air bag deployment;

10. A vehicle steering wheel and air bag module assembly comprising:
    a steering wheel having a hub portion and a rim portion and at least one spoke portion connecting the hub portion to the rim portion; and
    an air bag module mounted to the hub portion and including
    an air bag,
    an inflator for generating gas to inflate the air bag, and
    a bias apparatus being a flexible sheet of material attached to the air bag module and having an upper portion folded atop the air bag such that when the inflation of the deploying air bag is blocked, the upper portion of the bias apparatus is trapped between the rim portion and the air bag to bias the inflating air bag partially underneath the rim portion of the steering wheel.

11. The vehicle steering wheel and air bag module assembly of claim 10 wherein the bias apparatus is formed separate and independent from the air bag and is external to the air bag.

12. The vehicle steering wheel and air bag module assembly of claim 10 wherein the bias apparatus has a lower mounting portion located beneath the air bag.

13. The vehicle steering wheel and air bag module assembly of claim 10 wherein the bias apparatus has a lateral width greater than a lateral width of the rim portion.

14. The vehicle steering wheel and air bag module assembly of claim 10 wherein the bias apparatus has a lateral width approximately equal to a lateral width of the air bag.

15. The vehicle steering wheel and air bag module assembly of claim 10 wherein the air bag module further includes a cover covering the air bag, inflator, and bias apparatus and wherein the bias apparatus is separate and independent from the cover.

16. The vehicle steering wheel and air bag module assembly of claim 15 wherein the bias apparatus is separate and independent from the air bag.

17. The vehicle steering wheel and air bag module assembly of claim 10 wherein the air bag deploys in a rearwardly direction and wherein the hub portion and air bag module are offset from the rim portion in a forwardly direction.

18. The vehicle steering wheel and air bag module assembly of claim 10 wherein the steering wheel includes at least one space defined between the hub portion and the rim portion through which the air bag is biased by the bias apparatus during air bag deployment.

19. A vehicle steering wheel and air bag module assembly comprising:
    a steering wheel having a hub portion and a rim portion and at least one spoke portion connecting the hub portion to the rim portion; and
    an air bag module mounted to the hub portion and including
    an air bag,
    an inflator for generating gas to inflate the air bag, and
    a bias apparatus being a flexible sheet of material having a lower portion attached to the air bag module and having an upper portion folded atop the air bag such that when the inflation of the deploying air bag is blocked, the upper portion of the bias apparatus is trapped between the rim portion and the air bag to bias the inflating air bag underneath the rim portion and when the inflation of the deploying air bag is unrestrained, the bias apparatus drops downwardly away from the deploying air bag permitting the air bag to freely deploy.

* * * * *